A. A. MERRITT.
POWER TRANSMITTER.
APPLICATION FILED AUG. 26, 1912.
1,196,469.
Patented Aug. 29, 1916.
2 SHEETS—SHEET 2.
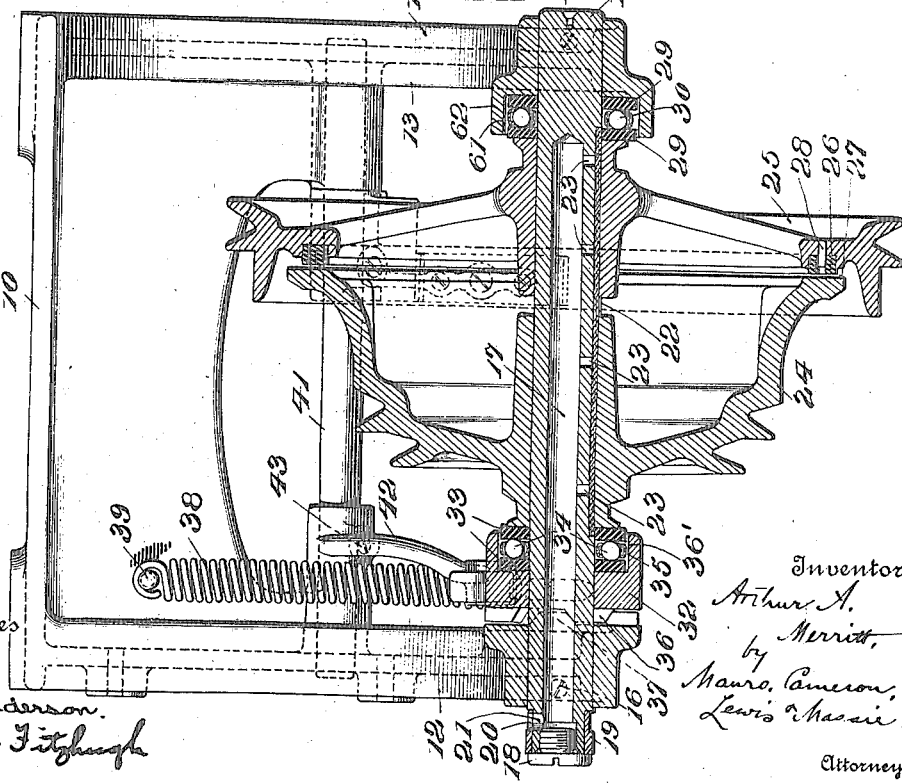

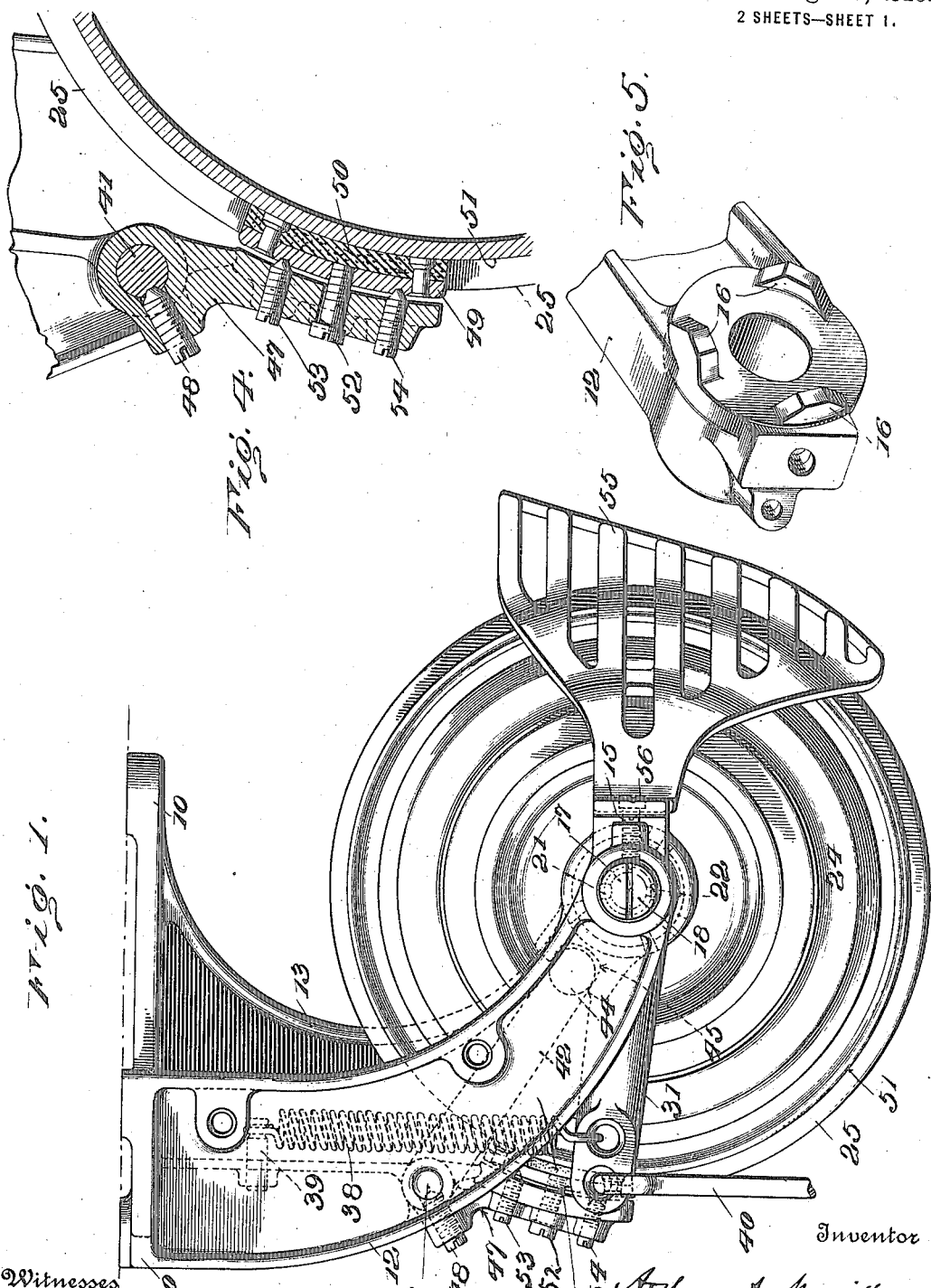

UNITED STATES PATENT OFFICE.

ARTHUR A. MERRITT, OF WORCESTER, MASSACHUSETTS, ASSIGNOR TO WILLCOX & GIBBS SEWING MACHINE CO., OF NEW YORK, N. Y., A CORPORATION OF NEW YORK.

POWER-TRANSMITTER.

1,196,469. Specification of Letters Patent. Patented Aug. 29, 1916.

Application filed August 26, 1912. Serial No. 717,182.

*To all whom it may concern:*

Be it known that I, ARTHUR A. MERRITT, of Worcester, Massachusetts, have invented a new and useful Improvement in Power-Transmitters, which invention is fully set forth in the following specification.

My invention relates to friction clutch power transmitters for imparting motion from a continuously rotating driving wheel or pulley to a driven wheel or pulley by pressing the same together with sufficient force to cause the driven pulley to rotate with the driving pulley through frictional contact therewith, and more particularly relates to power transmitters of this type especially adapted for driving sewing-machines.

The principal objects of the invention are the provision of simple and efficient means for forcing the pulleys into frictional engagement to actuate the driven pulley and for releasing and applying a brake to the driven pulley. These objects and other advantages are obtained by the improvements constituting the present invention, which may be more readily understood by reference to the accompanying drawings illustrating what is at present believed to be the preferred embodiment.

In said drawings—Figure 1 is a side elevation; Fig. 2 a vertical section with parts in elevation; Fig. 3 a top plan view; Fig. 4 a detail sectional view showing the adjustment of the brake shoe; and Fig. 5 a detail view of the end of one of the arms of the bracket or frame work showing the cam lugs on said arm.

The bracket or frame work comprises an L-shaped plate 10 adapted to be secured to the under-side of a sewing machine work-table or bench by three screws 11, 11, 11, said plate having on its opposite ends two depending curved arms 12 and 13. A horizontal shaft 14 connects the lower ends of the arms and is fastened in openings through the latter by set screws 15 and 16. Shaft 14 is hollow or bored out from one end to constitute an oil or lubricant reservoir 17, closed at its outer end (where the end of the shaft projects beyond the bracket arm 12), by a screw plug 18. A sleeve 19, rotatable on a reduced portion of the shaft adjacent to the head of the screw plug 18, is provided with a knurled surface by which it may be gripped and rotated, and has therethrough an opening 20 adapted to be brought into register with an opening 21 through the wall of the shaft 14 to the reservoir 17. With such openings brought into register, as shown in Fig. 2, lubricant may be fed into the reservoir 17 from an oil can or the like. The sleeve may then be turned to the position shown for example in Fig. 3 carrying the opening 20 out of register with the opening 21, thereby bringing a solid portion of the sleeve over the opening 21 to close the latter. Shaft 14 is longitudinally grooved or channeled along its lower side to receive a packing 22 of a suitable material such as leather, adapted to become saturated with oil and deliver the latter in sufficient quantity to lubricate the bearings of the pulleys on the shaft. Radiating openings 23, of which four are shown, extend through the wall of the shaft from the reservoir 17 to the groove containing the leather packing.

24 is a driving pulley and 25 is a driven pulley both rotatable on shaft 14, the former adapted to receive its rotation through a belt (not shown) from a suitable source of power, and the latter adapted to communicate its motion through a belt (not shown) to a sewing machine or other mechanism to be actuated. One face of the driven pulley 25 has a circular groove for receiving a ring 26 of leather or other suitable material for giving the desired frictional contact with the flat surface 27 of the driving pulley 24. Pins 28 projecting into openings in the leather ring 26 prevent the latter from slipping in its circular groove.

Between the inner face of the bracket arm 13 and the right hand end of the hub of driven pulley 25, there is positioned, about shaft 14, two rings 29, 29, preferably of steel, with interposed bearing balls 30 held in a suitable ball retainer or cage 61 of known construction. A circular flange 62 extending inward from the bracket arm 13 surrounds said rings and balls, constituting a housing therefor. As will be readily understood, the bearing balls receive the end thrust of the driven pulley 25 when the driving pulley 24 is forced into frictional engagement therewith.

31 is what may be designated for convenience the starting lever or shifter having a hub 32 at one end encircling the shaft 14 whereby the lever is rotatable on said shaft. Between the outer end of the driving pulley 24 and the inner face of the hub 32 there are positioned two rings 33, 33, preferably of steel, with interposed bearing balls 34 held in a cage or retainer 35. A circular flange 36′ projects from the hub 32 encircling the rings and balls and constituting a housing therefor. Projecting from the outer face of the hub 32 there are three cam-lugs 36 inclined at their opposite ends and adapted to coöperate with three similarly formed cam-lugs 37 projecting inward on the lower end of bracket arm 12. A spring 38, anchored to a pin 39 on the frame work and at its other end hooked into an opening at the outer end of lever 31, normally holds said lever in the position illustrated in Figs. 1 and 2, with the cam lugs 36 standing in the spaces between the cam lugs 37, as shown in Fig. 2.

40, Fig. 1, is a rod hooked at its upper end in an opening in the outer end of starting lever 31 and leading to a treadle or other similar actuating means not shown. When power is applied to the rod 40 to pull down the outer end of starting lever 31 against the tension of spring 38, the hub 32 of said lever is rotated about the shaft 14 causing the inclined surfaces of the cam-lugs 36 and 37 to coact, thereby shifting the lever 31 and its hub along the shaft 14 in the direction of the axis of the shaft, and through the bearing balls 34 imparting similar shifting movement to the driving pulley 24, pressing the flat face 27 of the latter into frictional engagement with the leather ring 26 to impart to the driven pulley 25 the rotation of the driving pulley.

41 is a horizontal rock-shaft supported at its opposite ends in bearings in the bracket arms 12 and 13 and rotatable therein. An arm 42 fixed to said shaft by a set-screw 43 is slightly bent, as shown in Fig. 2, to clear the spring 38, and at its outer end has a cylindrical-like head 44 working in a notch 45 formed between the inner end of the lever 31, where the latter joins the hub, and a lug 46 projecting from said hub.

47,—see particularly Fig. 4,—is a brake-arm fixed to shaft 41 by a set screw 48. A brake-shoe, preferably in the form of a curved steel plate 49, has a facing 50 of leather or other suitable material adapted to engage the cylindrical surface 51 of the driven wheel 25. A screw 52 passing loosely through an opening in the brake-arm 47 makes threaded engagement with an opening in the brake-shoe 49 to fasten the latter to the brake-arm. Adjusting screws 53, 54, pass through threaded openings in the brake-arm 47 on opposite sides of the screw 52 and have inner conical ends engaging depressions in the brake-shoe 49. By loosening one of the screws 53, 54, and tightening the other, the position of the brake-shoe may be adjusted to make the inner curved surface of the leather face 50 evenly contact the peripheral surface of the part 51 of the driven pulley 25, when the brake-shoe is in action to arrest the rotation of said wheel.

With the parts standing in the position shown in Figs. 1 and 2, with the lever 31 held in its elevated position by the spring 38, and the driving and driven wheels out of frictional engagement sufficient to impart rotation to the driven wheel, the spring 38 acting through the lever 31, notch 45, cylindrical head 44, lever 42, shaft 41, brake-arm 47, holds the brake-shoe firmly in contact with the driven pulley 25 to prevent rotation of the latter. When the lever 31 is actuated through the rod 40 to throw the driving pulley into frictional engagement with the driven pulley, as hereinbefore described, the downward movement of shaft 41 and the consequent rotation of the hub 32, rocks the outer end of arm 42 downward, through engagement of the cylindrical head 44 with the notch 45, and thereby rotates shaft 41 to swing brake-arm 47 upward and withdraw the brake-shoe from contact with the driven wheel. When the operator releases the downward pull upon rod 40, spring 38 acts to return the parts to the position illustrated in Figs. 1 and 2, the brake-shoe acting to promptly arrest rotation of the driven pulley 25.

55 is a skirt or dress guard of skeleton construction secured to the arms 12 and 13 by screws 56 and 57 respectively.

As will be apparent, the invention is not restricted to the particular structural embodiment thereof illustrated and described, but is susceptible of a variety of embodiments conforming to the definition of the invention given in the claims which follow.

What is claimed is:—

1. In a power transmitter, the combination of a driven member; a driving member; a shaft supporting both members; a starting lever rotatable about the shaft to shift one member along the shaft into engagement with the other member; a rock-shaft in addition to the first-named shaft; a brake-member carried by the rock-shaft and adapted by rotation thereof to be engaged with the driven member; and an arm extending from the rock-shaft to the starting lever and adapted upon actuation of the latter to rock the shaft and its brake-member.

2. In a power transmitter, the combination of a driven member; a driving member; a shaft supporting both members; a starting lever rotatable about the shaft to shift one member along the shaft into engagement with the other member; a rock-shaft in addition to the first-named shaft; a brake-member carried by the rock-shaft and adapted by rotation thereof to be engaged with the driven member; an arm extending from the rock-shaft to the starting lever and adapted upon actuation of the latter to rock the shaft and its brake-member; and a spring tending to hold said starting lever in position to permit disengagement of the driving and driven members and apply the brake-member to the driven member.

3. In a power transmitter, the combination of a driven member; a driving member; a shaft supporting both members; a starting lever rotatable about the shaft in a plane approximately at right angles thereto and acting to shift one of said members along the shaft into engagement with the other member; a rock-shaft disposed approximately parallel to the first-named shaft; a brake-member carried by the rock-shaft and adapted by rotation thereof to be engaged with the driven member; an arm extending from the rock-shaft to the starting lever and adapted upon actuation of the latter to rock the shaft and its brake-member.

In testimony whereof I have signed this specification in the presence of two subscribing witnesses.

ARTHUR A. MERRITT.

Witnesses:
W. T. LIDDALL,
LEO J. IRISH.